No. 11,998. Reissued June 3, 1902.

W. DICKEN.

CONTINUOUS MUFFLE FURNACE.

(Application filed Jan. 21, 1902.)

2 Sheets—Sheet 1.

WITNESSES:

F. W. Wright

S. C. Conner

INVENTOR

WILLIAM DICKEN

BY

Howson and Howson

HIS ATTORNEYS.

No. 11,998.

Reissued June 3, 1902.

W. DICKEN.

CONTINUOUS MUFFLE FURNACE.

(Application filed Jan. 21, 1902.)

2 Sheets—Sheet 2.

WITNESSES:

F. W. Wright

S. C. Comer

INVENTOR

WILLIAM DICKEN

BY

Howson and Howson

ATTORNEYS

UNITED STATES PATENT OFFICE.

WILLIAM DICKEN, OF HANLEY, ENGLAND, ASSIGNOR, BY MESNE ASSIGNMENTS, TO THE CLIMAX KILN COMPANY, LIMITED, OF BURSLEM, ENGLAND.

CONTINUOUS MUFFLE-FURNACE.

SPECIFICATION forming part of Reissued Letters Patent No. 11,998, dated June 3, 1902.

Original No. 647,811, dated April 17, 1900. Application for reissue filed January 21, 1902. Serial No. 90,636.

*To all whom it may concern:*

Be it known that I, WILLIAM DICKEN, a subject of the King of Great Britain and Ireland, residing at Hanley, in the county of Stafford, England, have invented new and useful Improvements in Continuous Muffle-Furnaces, of which the following is a specification.

This invention is for an improved continuous muffle furnace or kiln for firing pottery-ware and enameled iron; and it consists in constructing a circular kiln with an entirely-closed muffle having an endless horizontal platform or turn-table therein upon which the goods to be fired are placed and which is capable of being revolved in the muffle by mechanism operated from the outside of the kiln, said kiln having only one opening where the goods to be fired are set in and taken out and with flues arranged so that the flames and hot gases are carried for a portion of the circuit well around the muffle, but do not come in contact with the goods to be fired.

Figure 1:
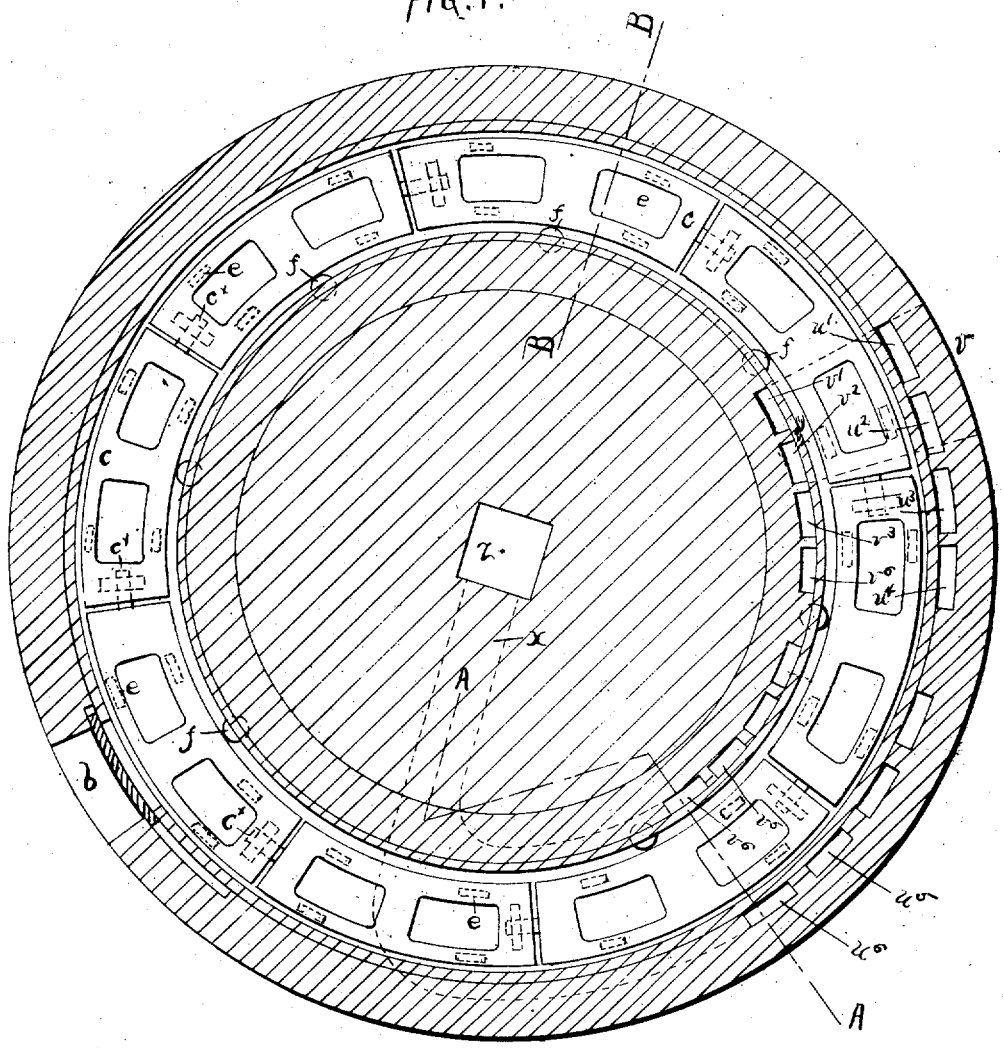
Figure 2:
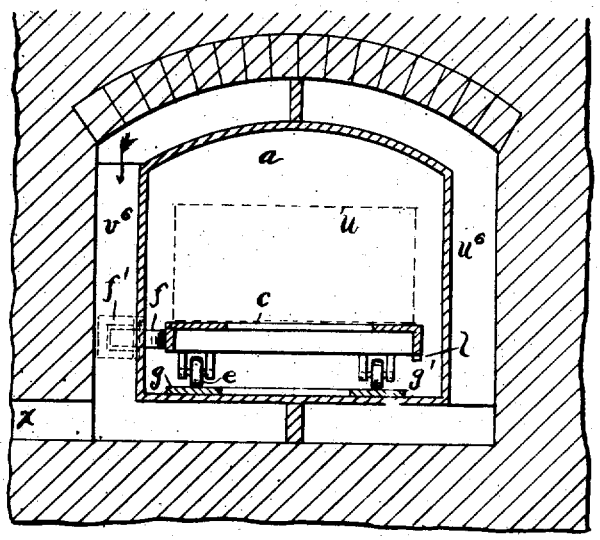
Figure 3:
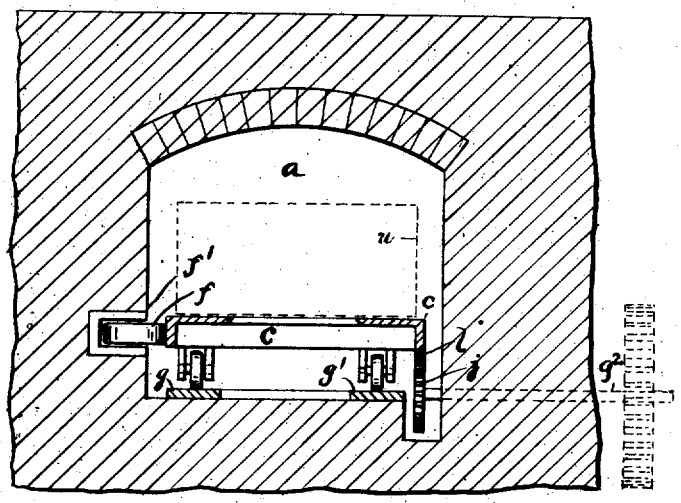

In the accompanying drawings, Figure 1 is a sectional plan of the improved kiln which forms the subject of this invention. Fig. 2 is a vertical section of the muffle in said kiln on line A A; and Fig. 3, a vertical section on line B B, drawn to an enlarged scale.

In the views similar letters refer to similar parts.

I construct a kiln with an entirely-closed or continuous annular muffle-chamber, as *a*, and with a single opening *b* in the side wall for obtaining access to the said chamber. I place within said continuous annular chamber an endless platform or turn-table constructed of cast-metal frames, as *c*, forming segments of a circle and coupled, as at $c^{\times}$, sufficient play being allowed at the ends of said segmental frames for expansion and contraction, but when coupled forming a complete circular table. The aforesaid table is carried on rollers, as *e*, which revolve on tram-plates *g g'*, that are secured to the bottom of the muffle. The table when moved around is retained in position in the muffle by antifriction-rollers *f*, placed horizontally in wall-boxes *f'*, that are fitted in the inner wall of the muffle. The table is moved around from the outside of the kiln by means of a horizontal shaft $g^2$, that is fitted in journals and provided at the inner end with a pinion *j* to work in a rack *l*, formed on or fitted to the under side of the outer edge of the table *c* and one or more toothed wheels on the outer end of said shaft, which gear into a wheel or wheels fitted on a shaft that is provided with a handle for turning said wheels.

The fire-hole is constructed on the opposite side of the kiln to that in which the opening for the goods to be set in or taken out is situated. The flues are arranged in proximity to the fire-hole, extending to about one-third of the circuit on each side of and partly over and under the muffle and are continued under the muffle to the flue *x*. The fire-hole may be situated at any convenient part of the kiln, as at *v*. The flames and hot gases pass from thence up two adjoining flues on either side of the muffle, as $u'$ $u^2$ and $v'$ $v^2$, and along the top over the muffle to the next two down-flues $u^3$ $u^4$ and $v^3$ $v^4$ and then under the muffle, alternately ascending and descending each succeeding two flues until finally passing by the flue *x* into the chimney *z* in the center of the kiln. Dampers are provided at suitable intervals to regulate the heat of the kiln.

In applying my invention I place the iron or clay boxes *u* (represented by dotted lines) containing the goods to be fired on the circular platform or turn-table *c*, hereinbefore described, by passing said boxes through the opening *b*, the table being moved slowly around as each box is placed in the kiln. The entrance to the kiln is then closed by a sliding door, and the turn-table with the ware is moved around by means of the rack, pinion, and train of wheels previously described. By these means the articles to be fired are gradually heated without coming in contact with the flames and after passing through the greatest heat in the kiln are gradually cooled before being removed from the kiln. By making the annular muffle-chamber *a* continuous—that is, a complete ring or endless with a single or side opening—instead of discontinuous—that is, an incomplete ring with two transverse or end openings—as is common, injurious air drafts are avoided in taking out or putting in the articles, thereby preventing the cracking and denting of the pottery. The boxes are independent of each other in transit through the kiln and the muffle is entirely closed during the process of firing the ware.

I claim as my invention—

The combination in a muffle furnace or kiln for firing pottery-ware and enameled iron, with a continuous or endless annular muffle-chamber having one opening where the goods to be fired are set in or taken out, of a turn-table or circular platform, means for revolving the turn-table from the outside of the furnace, a fire-hole, flues arranged in proximity thereto for conducting the flames and hot gases to a flue or flues along over and under the muffle for a portion of the circuit and passing to a chimney without coming in contact with the goods being fired, all substantially as and for the purposes hereinbefore described.

In testimony whereof I have signed my name to this specification in the presence of two subscribing witnesses.

WILLIAM DICKEN.

Witnesses:
F. W. WAIN,
HENRY R. KNEISS.